United States Patent Office 3,421,289
Patented Jan. 14, 1969

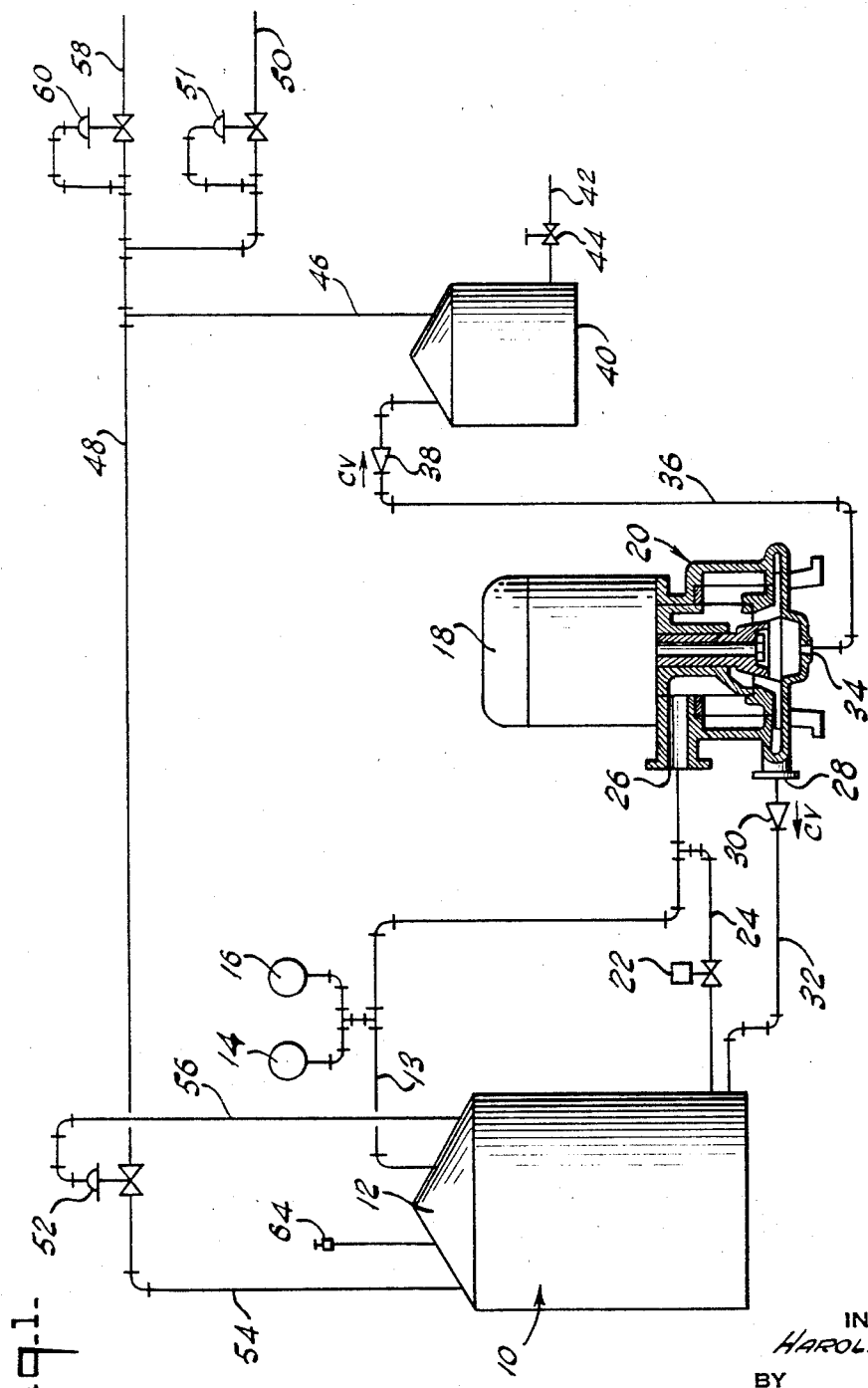

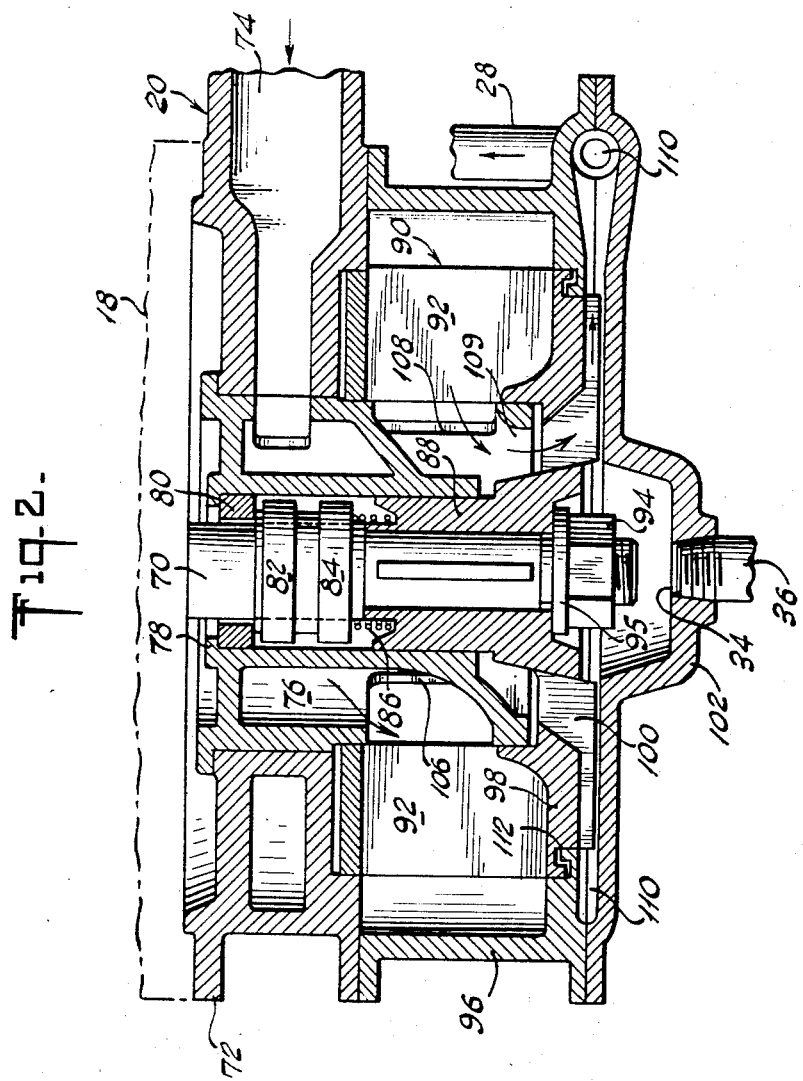

3,421,289
VAPORIZABLE LIQUID STORAGE RECEIVER RECOVERY METHOD
Harold E. Adams, Norwalk, Conn., assignor to The Nash Engineering Company, South Norwalk, Conn., a corporation of Connecticut
Continuation of application Ser. No. 405,014, Oct. 12, 1964. This aplication Sept. 13, 1966, Ser. No. 579,172
U.S. Cl. 55—89     1 Claim
Int. Cl. B01d 53/00; B01f 3/04

ABSTRACT OF THE DISCLOSURE

The invention resides in a method of recovering vapors and gases which form over a volatile liquid situated in a storage tank and which liquid is subjected to a considerable variation in temperature over a period of twenty-four hours. The vapors are directed to the inlet of a pump which is also taking liquid from the tank and centrifugally compresses the absorbable part of said vapors and gases into the liquid and returns the absorbed vapors and gases together with the liquid into the tank. Simultaneously with the centrifugal compression, the unabsorbable part of the gases and vapors are centripetally separated from the liquid within the pump itself and then the unabsorbable separated part of the gases and vapors is directed to a different location at a pressure higher than the pressure in the storage tank, all of such steps being performed simultaneously.

---

This application is a continuation of Ser. No. 405,014, filed Oct. 12, 1964, now abandoned.

This invention relates in general to vaporizable liquid storage receivers and in particular to a new and useful petroleum storage receiver system and method for maintaining such receivers within controlled pressure conditions and for recovering any vapor which forms during storage by condensing and recombining such vapor in the storage receiver.

The invention has particular application in use with petroleum storage receivers, either the high pressure systems having spherical tanks or the low pressure systems with the usual cylindrical tanks. In present practice such tanks are usually provided with a pressure limiting atmospheric vent in order to prevent over-pressurizing of the tank such as would occur during filling operations and from evaporation of the lighter components of the petroleum during changes in atmospheric conditions. The tanks have a tendency to heat up during the day to cause the formation of a large quantity of vapor which heretofore was relieved to the atmosphere and wasted. Since cooling during the night effects a great reduction of the internal pressure of the tank, the tanks are provided with vacuum relief valves to prevent collapse of the tank during such occasions. In some instances the tanks have been constructed with collapsible telescopic portions in order to permit breathing of the tank but such apparatus is costly and does not completely prevent loss of the material due to vaporization and leakage. There are numerous other schemes in the petroleum industry to limit the loss of vapor besides the telescopic roofs, such as the use of chemical film tops, flexible membranes, expansible auxiliary chambers, etc. Recently some attempts have been made to depressurize the tanks and to prevent vapor losses by removing the vapors from the tanks by using evacuating pumping systems, and thereafter attempting to recombine the vapors removed back into the liquid portion of the tank at reduced pressures.

In accordance with the present invention applicant has provided a novel method for depressurizing the tank, and for simultaneously recovering the gases and vapors in an efficient apparatus including means for separately discharging saturated liquid and unabsorbed gases in order to simplify the overall recovery system. In order to effect this recovery a novel compressor is provided for continuously removing the vapor from the top of the tank during high pressure conditions and for condensing the condensible portions of this vapor and delivering it back into the liquid portion of the tank at a pressure sufficient to overcome the liquid head in the tank.

The compressor includes means for simultaneously delivering noncondensible gases to another location for further use in the system. The compressor affords a means for gas absorption and endothermic reaction within the compressor itself and provides a dual function of delivering unabsorbed gases and vapors at required pressure to one receiver, while at the same time returning highly saturated liquid back to the original storage receiver at a required higher pressure to overcome the head of liquid in the receiver. The system provides a unitary recovery process to recombine escaped volatile gases and vapors with the liquid of the parent receiver, while at the same time acting as a gas separator to salvage enriched tank gases, delivering them to a separate utilizing system. The arrangement includes a compressor having ability to individually deliver unabsorbed gases to one location and saturated liquid to another. The complete system including the compressor provides a small sized apparatus for application to a vapor recovery system of a storage receiver, providing an efficient arrangement for the control of large petroleum storage tanks.

Accordingly, it is an object of this invention to provide a vapor recovery method for petroleum storage tanks.

A further object of this invention is to provide a vapor recovery method for storage tanks for removing volatile gases and vapors which form above the liquid of such tank and continuously recombining highly saturated liquid back to the original storage receiver and delivering unabsorbed gases and vapors at a higher pressure to another receiver for utilization in the system.

A further object of the invention is to provide a method for recovering vapors and gases which form above a storage tank including the steps of removing and compressing the gases and vapors, returning saturated liquid back to the original storage receiver and delivering unabsorbed gases and vapors to another location for utilization in the refinery storage system.

A further object of this invention is to provide a storage receiver vapor recovery system which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a schematic elevational layout of a vapor recovery system constructed in accordance with the invention; and FIG. 2 is an enlarged transverse section of the compressor and vapor separator indicated in FIG. 1.

Referring to the drawings in particular the invention as embodied therein includes a large petroleum storage receiver or tank generally designated 10 having a conical roof 12. The invention is equally applicable to all types of storage receivers used for storing vaporizable liquids in which the vapors formed have the effect of pressurizing the storage vessel. While the invention is shown in reference to a petroleum storage receiver such as a low pressure conical top cylindrical tank 10 it is equally applicable to high pressure storage systems such as those that include a spherical storage vessel.

When the tank 10 is subjected to heating as during long exposure to the sun during the day, vapors are formed above the liquid in the tank 10 and these build up in pressure as the heating of the tank continues. The vapors are vented through a line 13. Communicating with the vent line 13 are a set of pressure sensitive switches 14 and 16 which regulate the starting and stopping of an electric drive motor 18 for a combination compressor and vapor separator pump generally designated 20. The pressure sensitive switch 14 effects turning on of the motor 18 when the pressure increases to a predetermined amount and the pressure sensitive switch 16 effects shutting off of the motor 18 when the pressure at the top of tank 12 has gone below a predetermined amount. In the case of a low pressure tank the electric motor 18 is shut off when the pressure reaches an amount slightly above atmosphere, while in the case of a high pressure tank, the pressure and temperature ranges are compatible with the pressure requirements for the tank contents.

Operation of the electric motor 18 to drive the compressor and separator pump is also effective to operate a solenoid valve 22 located in a line 24 extending from the tank 10 to the conduit 13. Vapors which are removed from the tank 10 to the line 13 combine with a quantity of cool liquid from the lower portion of the tank which flows through the conduit 24 and each enters an inlet 26 of the combination compressor and vapor separator pump 20.

The pump 20 is effective to cause interactions of the two fluids (namely, the vapors and gases removed from the upper portion of the tank 10 and the cool liquid from the lower portion). The principal reactions which take place throughout the compression cycle produced by the pump 20 include the condensation of hot vapors by the cool liquid fuel, the absorption of gas by this liquid fuel, and some endothermic reactions between the vaporized light ends of the vapor fuel and the liquid fuel.

The pump 20 is effective to discharge enriched sealing liquid and condensed constituents of the vapor and gas removed from the top of the tank 10 through an outlet 28 and through a one way or check valve 30 located in a conduit 32 back into the tank 10. The check valve 30 permits flow from the pump to the tank 10, but not vice versa.

The unabsorbed and noncondensible gases and vapors are separately discharged by the pump 20 through a central lower gas and vapor discharge 34 and through a conduit 36 having a one way or check valve 38 into a gas retention tank 40. Check valve 38 permits flow of the unabsorbed and noncondensible gases and vapors from the pump 20 to the tank 40 but not vice versa. The gases are delivered from the pump 20 to the tank 40 at a sufficiently high pressure to maintain the tank 40 at a slightly higher pressure than the normal pressure in the tank 10.

The purpose of the gas retention tank 40 is to provide a source of pressurized gas for ironing out the fluctuations in the operation of filling and removing fuel from the tank 10. The gas under pressure is reserved to serve as a temporary salvage storage tank for gases rejected by the compressor 20 to prevent their loss to the atmosphere. The tank is provided with a condensate drain line 42 connected to the lower end and opened either automatically, or as in this instance by a manual valve 44 to permit draining of condensate from the tank when necessary or desirable.

The tank 40 is connected through a conduit 46 to a main conduit 48 connecting into the upper portion of the tank 10. An auxiliary gas line 50 connects into the line 48 and is provided with a pressure control valve 51 which opens when the pressure in the line 48 increases to a predetermined amount, to effect discharge of the gas from the gas retention tank 40 into the auxiliary service line 50. The service line 50 may be connected for the operation of other tanks similar to the tank 10 or for use in connection with the operation of another recovery system, for example.

When it is desired to re-pressurize the tank 10 upon the usual withdrawal of fuel during use, gas is admitted through an automatic control valve 52 located in the conduit 48 and through a conduit 54 into the tank 10. The pressure control valve 52 is provided with a pressure sensitive line 56 which extends into the top 12 of the tank 10 and effects opening of the valve 52 when the pressure is reduced to a predetermined amount.

Gas is first supplied to the tank 10 from the gas retention tank 40 but may also be supplied from a conduit 58 which is connected to an auxiliary pressurized gas source. An automatic pressure control valve 60 is provided in the conduit 58 in order to open this conduit when the pressure in the conduit 48 is reduced to a predetermined amount.

In addition to the above system for regulating the pressure in the tank 10 there is provided for safety purposes a standard atmospheric and relief valve 64.

In accordance with the invention the compressor and separating pump includes a central rotor shaft 70 which forms an extension of the shaft of the driving motor 18. The combination compressor and vapor separating pump 20 comprises a cylindrical inlet manifold or jacket 72 having an inlet passage 74 defined therein. The jacket 72 is affixed to the lower end of the electric motor 18 and is provided with a central hollowed portion to receive a port member 76. The port member is hollowed and extends over the shaft 70 and is provided with a flanged portion 78 which holds a stationary seal ring 80 bearing against a rotating seal ring 82 which is driven by a gasketed housing 84 and biased by a spring 86 to form a well-known mechanical shaft sealing assembly. The other end of the spring 86 abuts against a hub portion 88 of a vaned rotor generally designated 90 having a plurality of symmetrical rotor blades 92. The rotor is keyed to the shaft 70 for rotation therewith and is locked against end movement by a nut 94 tightened over a washer 95. The rotor 90 is enclosed by housing portion 96. The housing 96 is contoured interiorly in substantially an oval shape to form at least two lands or flattened portions separated by two lobes in accordance with conventional liquid ring compressor design.

In accordance with the invention the rotor 90 also includes a shroud ring 98 and blade extension 100 formed integrally with the blades 92 and the shroud ring 98 but extending axially outwardly therefrom. The housing 96 is covered by a plate 102 having the central discharge opening 34. Liquid gas and vapors coming in through the passage 74 are directed into a separated end of the port member 76 through inlet ports 106 where the reactions within the pump between the hot gases, vapor and cool liquid are accomplished by the rotation of the rotor 90 within the housing 96. The liquid, rich in condensed vapors and absorber gases, together with noncondensible vapors and unabsorbed gases is then delivered through discharge ports 108 and through an annular passage 109 defined in the other end of the port member 76 which communicates with the blade portion 100 of the rotor 90. In this instance the blades 100 are formed to a diameter approaching the diameter of the blades 92. The blades 100 are effective to discharge the noncondensible vapors and unabsorbed gases centrally by centripetal action and deliver the condensed vapors, and absorbed gases with the liquid into an annular volute 110 formed between the end plate 102 and the housing 96.

The volute chamber 110 extends outwardly to the discharge 28. A peripheral seal is formed between the volute 110 and the lobes of the housing 96 by the liquid seal arrangement afforded by a groove 112 formed at the outer periphery of the shroud 98. The noncondensible gases and vapors are centripetally driven to the center of the fitting 102 where they are collected and discharged through the threaded opening to the discharge 34.

In the event that a separate discharge of the noncondensible gases and vapors through the discharge 34 is not required, this opening can be sealed off with a plug (not shown). The noncondensible gases and vapors will then be discharged with the liquid through the volute 110. The final discharge pressure of the liquid through the volute 110 depends on the size of the blades 100. The device as described permits the removal of large quantities of liquid from the tank 10 as well as accumulated vapors in the upper portion and effects their continuous separation and delivery to separate localities at different pressures, if desired.

Because of the centripetal separation of gas and liquid achieved with the combination compressor and separator pump 20, the unabsorbed gas is discharged independently and at the required intermediate pressure. The gas saturated liquid is centrifugally discharged by the help of the blades 100 through the discharge openings 110 and 28 at a pressure sufficiently high to overcome the friction and static head required for the return of this liquid to the lower portion of the tank 10.

While providing an apparatus such as the combination compressor and separating pump 20 it is possible to divide the duties within the rotating element of the pump so that the liquid ring compressor portion is relieved of the necessity of compressing and discharging over an unnecessary and inefficient compression ratio such as it would have to do if it had to discharge both the saturated seal and the unabsorbed gas at a pressure sufficient to discharge the seal into the bottom of the tank 10. Hence, the work of compression is done in the compression range compatible with the characteristics of a normal compressor. By operating at a relatively efficient compression range, the pump 20 achieves maximum capacity, where the usual liquid ring compressor applied to a service of this nature would be forced to operate beyond its normal compression range and as a result at a reduced capacity. Thus, in the system described by the present invention, two operations are combined in a single structure by the novel combination compressor and vapor separating pump 20 and, as a result, the various portions may operate at reduced capacities over the previous types of apparatus.

It should be pointed out that should this same type of operation be divided into two structures each performing a function similar to the combined functions performed by the pump 20, that is, a separate compressor for the delivery of gas and its seal at an intermediate pressure and another centrifugal pump to pick up the sealing liquid from a separate tank and deliver it to the bottom of the receiver, it would require not only the additional pump equipment but it would also be less efficient because of the requirement to pick up the liquid from a static condition. In the present instance the pump 20 directly converts the rotational energy already imparted to the liquid directly into pressure. Because of its additional unique through flow pattern built in liquid impeller, the system of the present invention can handle over three times as much liquid seal during the compression cycle than is possible with previous liquid ring compressor systems. Because of the interactions of the liquid within the device it is possible to salvage much more of the constituent parts than in apparatus employed heretofore.

While a specific embodiment of the invention has been shown and described in detail to illustrate the application of the invention principles, it will be understood that the invention may be embodied otherwise without departing from such principles.

What is claimed is:

1. A method of recovering vapors and gases which form above a volatile liquid in a storage tank, comprising simultaneously directing liquid gases and vapors from the tank into a liquid-ring pump, said gases and vapors being in part absorbable into said liquid and in part unabsorbable into said liquid, centrifugally compressing the absorbable part of said gases and vapors into said liquid and returning the liquid together with the absorbed gases and vapors therein back to said tank, and simultaneously with said centrifugal compressing centripetally separating within said pump the unabsorbable part of said gases and vapors from the liquid at a point where said unabsorbable part is vented and directing the unabsorbable, separated part of said gases and vapors, at a pressure higher than that in said tank, to another location, all of said steps being performed simultaneously.

References Cited

UNITED STATES PATENTS

| 2,307,251 | 1/1943 | Woods et al. | 55—88 |
| 2,947,379 | 8/1960 | Aubrey | 55—88 |

REUBEN FRIEDMAN, *Primary Examiner.*

C. N. HART, *Assistant Examiner.*